United States Patent
Noorjahan et al.

(10) Patent No.: US 12,281,191 B2
(45) Date of Patent: Apr. 22, 2025

(54) DEVOLATILIZATION OF PLASTOMER PELLETS

(71) Applicant: NOVA Chemicals (International) S.A., Fribourg (CH)

(72) Inventors: Abolfazl Noorjahan, Calgary (CA); Stephen Brown, Calgary (CA); Lawrence Van Asseldonk, Sarnia (CA); Robert Van Asseldonk, Airdrie (CA); Jeffrey Cahill, Calgary (CA); Carlos Duque, Calgary (CA); William Oberg, Red Deer (CA)

(73) Assignee: NOVA Chemicals (International) S.A., Fribourg (CH)

( * ) Notice: Subject to any disclaimer, the term of this patent is extended or adjusted under 35 U.S.C. 154(b) by 817 days.

(21) Appl. No.: 17/436,046

(22) PCT Filed: Feb. 27, 2020

(86) PCT No.: PCT/IB2020/051678
§ 371 (c)(1),
(2) Date: Sep. 2, 2021

(87) PCT Pub. No.: WO2020/178679
PCT Pub. Date: Sep. 10, 2020

(65) Prior Publication Data
US 2022/0169758 A1    Jun. 2, 2022

Related U.S. Application Data

(60) Provisional application No. 62/814,985, filed on Mar. 7, 2019.

(51) Int. Cl.
*C08F 6/00* (2006.01)
*C08F 210/16* (2006.01)

(52) U.S. Cl.
CPC ............ *C08F 6/005* (2013.01); *C08F 210/16* (2013.01)

(58) Field of Classification Search
CPC ................................ C08F 6/005; C08F 210/16
See application file for complete search history.

(56) References Cited

U.S. PATENT DOCUMENTS

| | | | |
|---|---|---|---|
| 6,063,879 A | 5/2000 | Stephan et al. | |
| 6,878,658 B2 | 4/2005 | Jaber | |
| 9,512,282 B2 | 12/2016 | Li et al. | |
| 2017/0226240 A1 | 8/2017 | Dooley | |
| 2018/0350532 A1 | 12/2018 | Liu | |

FOREIGN PATENT DOCUMENTS

| | | | | |
|---|---|---|---|---|
| CA | 3041908 A1 | 6/2018 | | |
| EP | 0 470 77 A1 | 3/1982 | | |
| EP | 0590947 A1 * | 4/1994 | | |
| WO | WO-2004/039848 A1 | 5/2004 | | |
| WO | WO-2013022529 A1 * | 2/2013 | ......... | B01D 53/0473 |
| WO | WO-2019/141672 A1 | 7/2019 | | |

OTHER PUBLICATIONS

ASTM D1238-13; "Standard Test Method for Melt Flow Rates of Thermoplastics by Extrusion Plastometer", Copyright by ASTM Int'l May 24, 2019, 16 pages.
ASTM D1525-07; "Standard Test Method for Vicat Softening Temperature of Plastics", Copyright by ASTM Int'l Oct. 16, 2019, 9 pages.
ASTM D4526-12; "Standard Practice for Determination of Volatiles in Polymers by Static Headspace Gas Chromatography", Copyright by ASTM Int'l Sep. 3, 2021, 4 pages.
International Search Report and Written Opinion corresponding to PCT/IB2020/051678, dated May 29, 2020, 7 pages.

* cited by examiner

*Primary Examiner* — Rabon A Sergent
(74) *Attorney, Agent, or Firm* — Thomas J. Styslinger

(57) ABSTRACT

The devolatilization of plastomer pellets is undertaken using nitrogen that is recycled in the process. Volatile hydrocarbons are removed from the nitrogen in a hydrocarbon extraction vessel (e.g. an adsorbent bed). In an embodiment, the recycled nitrogen contains less than 300 ppm of volatile hydrocarbons after being treated in the adsorbent bed.

15 Claims, 1 Drawing Sheet

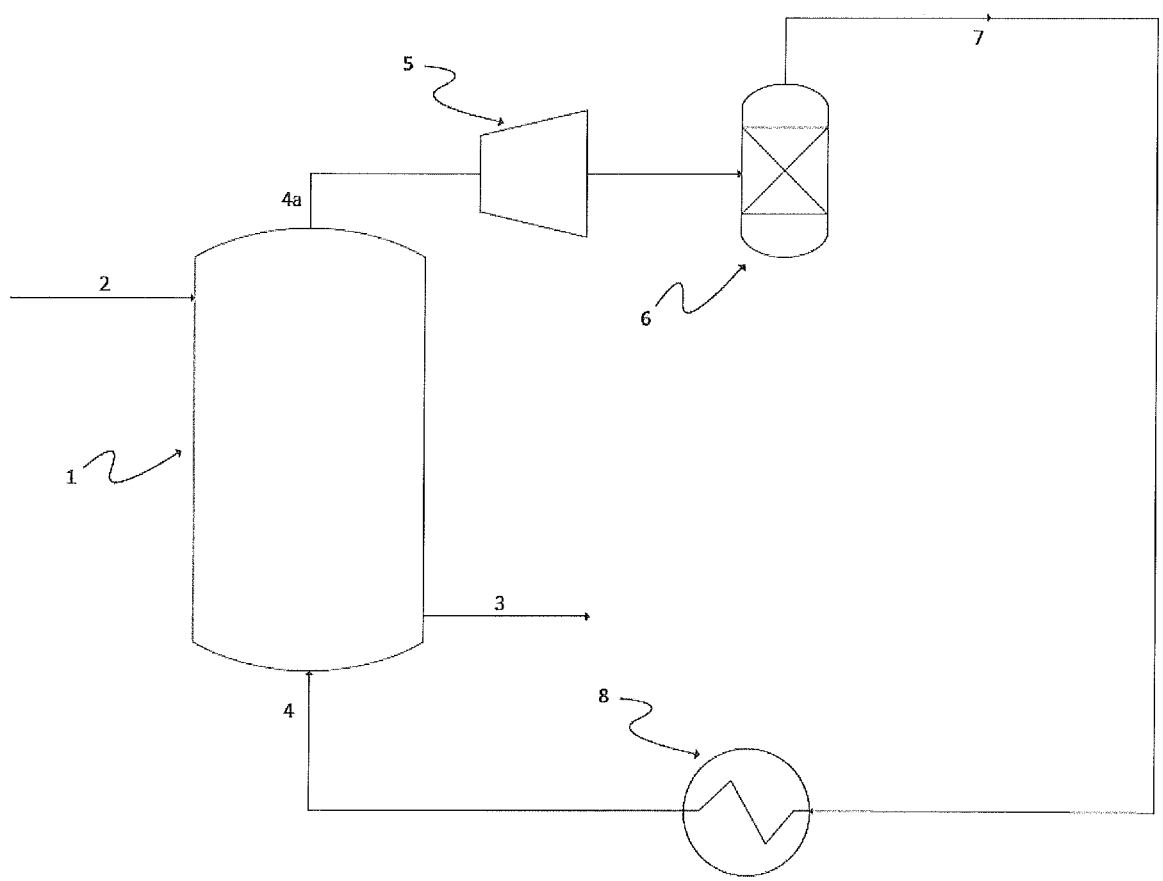

DEVOLATILIZATION OF PLASTOMER PELLETS

CROSS-REFERENCE TO RELATED PATENT APPLICATIONS

This application is a U.S. National Phase Application under 35 U.S.C. § 371 of International Application No. PCT/IB2020/051678, filed Feb. 27, 2020, which claims the benefit of priority to U.S. Provisional Patent Application No. 62/814,985, filed on Mar. 7, 2019, both of which are incorporated herein by reference in their entirety.

TECHNICAL FIELD

This invention relates to the devolatilization of pellets of ethylene-alpha olefin plastomers.

BACKGROUND ART

The term "plastomer" refers to ethylene-alpha olefin copolymers having a low density (generally less than 0.905 g/cc, particularly from 0.865 to 0.905 g/cc, especially from 0.880 to 0.905 g/cc). Plastomers are typically made in a solution polymerization process because they are "sticky" (and this stickiness makes it difficult to prepare them in a slurry or gas phase process). Stickiness also causes difficulty with the removal of hydrocarbon residues that remain in the copolymers from the devolatilization process.

Various techniques for the removal of hydrocarbon residues are known. For example, it is known to:
1) strip comonomer form hydrocarbon solutions prior to the recovery of the solid copolymer;
2) strip hydrocarbon residue from solid copolymer particles (or "powder") that have been recovered from the solution but not yet pelletized;
3) use a devolatilizing extruder to remove hydrocarbon residue during the pelletizing operation; and
4) strip hydrocarbon residue from pellets of the copolymer. (The present invention generally relates to this operation/process; but may also include the optional use of techniques 1-3 above).

The use of various stripping agents—including air; nitrogen and gaseous hydrocarbon (such as propane) has been reported in the past.

We have now discovered that nitrogen may be used and then reused (recycled) for the stripping of polymer pellets, especially when the recycled nitrogen has been treated to reduce the level of hydrocarbon in the recycled nitrogen to less than 300 ppm.

SUMMARY OF INVENTION

In an embodiment, the invention provides:
a process for the production of devolatilized ethylene-alpha copolymer having a density of from 0.865 to 0.905 g/cc and a melt index, 12, of from 0.3 to 30 g/10 minutes as measured by ASTM D1238 at a temperature of 190° C. using a 2.16 kg load, said process comprising:
i) providing raw pellets of ethylene-alpha olefin copolymer to a devolatilization bin, wherein said raw pellets are characterized by containing volatile hydrocarbon;
ii) providing nitrogen gas to said devolatilization bin;
iii) discharging devolatilized pellets from said devolatilization bin, wherein said devolatilized pellets contain a lower level of said volatile hydrocarbon than said raw pellets;
iv) recovering mixed stripper gas comprising a mixture of nitrogen and hydrocarbon from the overhead of said devolatilization bin;
v) directing said mixed stripper gas to a hydrocarbon extraction vessel;
vi) recovering purified nitrogen from said hydrocarbon extraction vessel; and
vii) recycling said purified nitrogen to said devolatilization bin.

In an embodiment, the invention provides:
a process for the production of devolatilized ethylene-alpha copolymer having a density of from 0.865 to 0.905 g/cc and a melt index, 12, of from 0.3 to 30 g/10 minutes as measured by ASTM D1238 at a temperature of 190° C. using a 2.16 kg load, said process comprising:
i) providing raw pellets of ethylene-alpha olefin copolymer to the top portion of a devolatilization bin, wherein said raw pellets are characterized by containing volatile hydrocarbon;
ii) providing an upflow of nitrogen gas to the bottom portion of said devolatilization bin, wherein said nitrogen is provided at a temperature of from 40 to 70° C.;
iii) discharging devolatilized pellets from said devolatilization bin, wherein said devolatilized pellets contain a lower level of said volatile hydrocarbon residue than said raw pellets;
iv) recovering mixed stripper gas comprising a mixture of nitrogen and hydrocarbon from the overhead of said devolatilization bin;
v) directing said mixed stripper gas to a hydrocarbon extraction vessel;
vi) recovering purified nitrogen from said hydrocarbon extraction vessel; and
vii) recycling said purified nitrogen to the bottom of said devolatilization bin.

The process of this invention is suitable for polyolefins having a density of from about 0.865 to about 0.970 g/cc. It is especially suitable for the lower end of this density range (where conventional steam stripping is not suitable because of the low VICAT softening temperature of the lower density plastomers and elastomers). Thus, in a commercial facility that produces ethylene-alpha olefin copolymers (and even homopolymers), the process of this invention may also be used with the higher density polymers.

BRIEF DESCRIPTION OF DRAWING

FIG. 1 provides a process flow diagram of an embodiment of the invention.

In FIG. 1, plastomer pellets are provided to the devolatilization bin 1 via pellet inlet line 2 (located close to the top of the devolatilization bin 1) and exit via pellet exit line 3 (located close to the bottom of the devolatilization bin 1).

In this embodiment, nitrogen enters the devolatilization bin 1 via feed line 4. The nitrogen flow includes recycled nitrogen and some pure or "make-up" nitrogen. The nitrogen exits via line 4a (and this is provided as an "upflow") in this embodiment. The nitrogen is compressed using compressor 5 before entering the hydrocarbon extraction vessel 6, which, in this embodiment, is a vessel that contains alumina adsorbent and is operated on a temperature swing protocol. Recovered/purified nitrogen is directed to heat exchanger 8 before being recycled into the devolatilization bin 1 via feed line 4. Additional nitrogen (also referred to as make-up nitrogen) may be added through the feed line 4 or through an optional additional feed line (not shown).

DESCRIPTION OF EMBODIMENTS

This invention relates to the treatment of polyolefin pellets (as opposed to non pelletized polyolefin solids that are typically referred to by persons skilled in the art as "granular" or "powder" polyolefin).

A brief overview of typical operations to convert a solution of polyolefin (i.e. where the solution is produced by a solution polymerization process) to polyolefin pellets follows.

Solution Polymerization Process

Descriptions of typical solution polymerization process for the preparation of ethylene-alpha olefin copolymers are provided in U.S. Pat. No. 9,512,282 ('282 patent); U.S. Pat. Nos. 6,063,879; 6,878,658; and U.S. application 20180350532 (Zhang et al.). Typical comonomers include 1-butene; 1-hexene; 1-octene (and mixtures thereof). The solvent is typically a mixture of $C_6$ to $C_{10}$ alkanes and iso alkanes and may also include cyclic hydrocarbon (such as cyclopentane or cyclohexene).

The description in the '282 patent includes a review of some suitable/typical reactor configurations; catalyst deactivation systems and polymer recovery systems that include one or more vapor/liquid (V/L) separations. The output from the final V/L separator includes a molten polymer stream that contains the ethylene-alpha olefin copolymer together with residual hydrocarbons (especially residual solvent and residual alpha olefin comonomer). This molten polymer stream is typically directed through an extruder having a die plate at the extruder exit. The die plate is typically configured with a plurality of circular holes, thereby leading to the formation of "spaghetti strands" of extrudate. These strands are continuously cut by one or more rotating die plate cutters (which are also referred to as "knives" by those skilled in the art) to form the pellets. In some pelletizing operations, a melt pump (also referred to as a gear pump) may be located between the exit of the extruder and the die plate to generate additional pressure without causing overheating. In general, lower melt temperatures are preferable to higher melt temperatures to avoid degradation of the polymer. The die plate cutters may be water cooled. In general, a lower die plate temperature is used for plastomers (in comparison to the die plate temperature used for higher density ethylene copolymers) because of the stickiness of the plastomers. The pellets are conveyed away from the die plate using water and this water may be chilled or, alternatively, heated (as discussed, below). It is known to those skilled in the art that higher water temperatures are typically used for higher density/ higher crystallinity polymers (in comparison to the water temperature used for plastomers). The pellet size and shape for the plastomers may be similar to the pellet size and shape for higher density polyethylenes. The plastomer pellets may contain from about 3 to 6 weight % of the residual hydrocarbon. Additives may be incorporated into the "cutter water" to mitigate foaming and stickiness problems and the use of these additives is known to those skilled in the art.

The conventional water conveying system described above (i.e. a slurry of pellets in water being transferred through tubes) is used to move the pellets to the devolatilization operations/finishing operations. This slurry water will be at a higher temperature than the water used to chill the die plate and may be used to heat the pellets. Heating the pellets to the devolatilization temperature using a gas stream would take a long time. It is preferred to pre-heat pellets by the slurry water stream to a temperature close to the desired devolatilization temperature to facilitate the subsequent devolatilization step. In general, the slurry water temperature will be a function of the softening temperature of the copolymer in the slurry.

Spin Dryer

Water may be removed from the slurry using a conventional spin dryer. After spin drying, the pellets will typically contain about 0.05 weight % water. Air may be used to further reduce the water content. Drying the pellets prior to the devolatilization step is preferred so as to prevent reduction in pellets temperature resulting from water evaporation at the devolatilization temperature.

In an embodiment, the slurry water will be used to heat (or alternatively, cool) the pellets to a temperature that is about 5° C. lower than the VICAT softening temperature. Thus, the slurry water for a copolymer having a high VICAT temperature may be heated whereas the slurry water for a copolymer having a low VICAT temperature may require chilling.

The water that is removed in the spin dryer may be returned to the die plate cutter for reuse/recycle.

Transfer of "Dry" Pellets to Devolatilization Bins

The "dry" pellets are then directed to a hold up bin that is preferably purged with nitrogen. The pellets are then conveyed to a devolatilization bin. In an embodiment, this conveyance is undertaken using a flow of nitrogen (and, in an embodiment, this nitrogen is "recycled" from the nitrogen purification system).

The temperature of the nitrogen used for this conveyance should also be controlled (again, to a temperature that is no greater than 5% lower than the VICAT softening temperature in order to mitigate stickiness problems).

Devolatilization Bins

In an embodiment, these bins will hold from about 150 to about 200 thousand kilograms of plastomers and have a hold up time of from about 12 to about 72 hours. Thus, for a typical world scale plant, multiple bins will be required.

In an embodiment, the bins have a conventional silo shape—i.e. a simple bin having a circular cross-sectional shape. In an embodiment, the height/diameter ratio is from 3/1-8/1, especially from 4 to 5/1. In an embodiment, a cone is fitted at the bottom of the silo. The cone portion of the silo can be further broken into separate compartments to minimize the consolidation pressure experienced by pellets in that location of the silo.

In an embodiment, the bin is operated under vacuum to improve the rate of devolatilization. In a different, alternative embodiment, the bin is operated under a small positive pressure to limit ingress of air.

In an embodiment, the positive pressure is from 102 to 109 kPa. Operating at pressures slightly above atmospheric pressure is preferred. Low-pressure bin operation can be costly due to vacuum requirements and high-pressure bin operation requires a significant amount of stripping agent to complete devolatilization process to the same final pellet VOC content.

The bins are preferably purged with nitrogen even when empty and when being unloaded.

These bins are loaded via nitrogen conveyance from the hold up bin.

As noted above, the pellets will typically contain from about 3 to 5 weight % residual hydrocarbon before the devolatilization operation. In an embodiment, the level of residual hydrocarbon (or volatile organic carbon, VOC) will be reduced to below 500 ppm, especially below 300 ppm, and most especially below 150 ppm after devolatilization. Lower levels may be achieved (at greater cost) using larger residence times and or by increasing the temperature and/or flow rate of nitrogen through the bins.

In an embodiment, the bins are operated in batch mode—i.e. the bins are emptied/readied for reuse once the target VOC level is achieved.

In an embodiment, the bins are insulated. In an embodiment, the bins are equipped with heat tracing to compensate for heat loss in cold weather. In an embodiment, the exterior of the bins are equipped with a system to apply cooling water in hot weather—for example, a simple water spray may be applied to the exterior.

Nitrogen Supply to Devolatilizing Bins

The nitrogen is normally heated to improve stripping/devolatilization efficiency. However, the maximum temperature of the nitrogen is influenced by the softening temperature of the plastomer that is being treated. Softening temperature may be measured by ASTM D1525 with the result being reported as the VICAT temperature (or VICAT softening temperature) and reported in degrees Celsius. In an embodiment, the maximum temperature of the nitrogen is 5° C. less than the VICAT softening temperature of the plastomer. In an embodiment, the flow rate of nitrogen per hour is from 2-10 weight %, especially from 4-6 weight %, of the weight of the plastomer in the bin (for example, a bin that contains 200 tons of plastomer could be provided with a nitrogen flow rate of 10 tons/hour to provide a nitrogen flow rate of 5 weight %/hour, based on the plastomer weight).

In an embodiment, the nitrogen is added near to the bottom of the bin using a plurality of feed nozzles. In an embodiment, the flow rate and velocity of the nitrogen is not high enough to develop a fully fluidized bed—the advantages of avoiding a fully fluidized bed are known to those skilled in the art and are described in U.S. Pat. No. 5,478,922 (Rhee, to UCC).

In an embodiment, a small portion of the pellets are recirculated from bottom to top within the bin. In the case of lower density resins, devolatilized in larger bin sizes, this step can be helpful in preventing pellets from clumping and blocking the devolatilization bin. Pellets at the bottom portion of the devolatilization bin experience a larger consolidation pressure and are more prone to clumping. Pellets recirculation may be done by directing some of the pellets through a valve at the bottom of the bin to a collection chamber. The pellets in the collection chamber are then conveyed with nitrogen to the top of the bin. In an embodiment, the amount of pellets that are transferred is from about 1 to 5 weight % per hour of the total pellet weight. The recirculation rate is preferred to be kept to an optimum value to minimize the adverse impact of recirculation on overall devolatilization time.

Nitrogen Purification System

The fluid at the top of the bins is a mixture of nitrogen and volatile hydrocarbon that has been stripped from the pellets. This fluid may be referred to as "mixed stripper gas" and is directed to a nitrogen purification system for the removal of hydrocarbon.

The following types of technologies are generally suitable for the removal of volatile hydrocarbon (which may also be referred to as volatile organic hydrocarbon, or "VOC" by those skilled in the art) from the mixed stripper gas.

1. Adsorption

A typical adsorption technology uses a bed that is packed with an adsorption medium (such as alumina, silica gel, a molecular sieve, zeolite, or active carbon). The adsorption medium removes the VOC until the adsorption limit of the bed is reached. At that point, the bed is regenerated to remove the VOC.

Typical examples of adsorption and regeneration operations include pressure swing adsorption (PSA); temperature swing adsorption (TSA); and vacuum swing adsorption (VSA). Each of these operations is well known and commercially available.

2. Absorption

The absorbent is generally a liquid (such as silicone oil) and the process may be conducted in a packed bed, a plate bed or a spray tower that provides good contact between the mixed stripper gas and the absorbent liquid.

3. Condensation

A compressor and/or driller is used to condense VOC to a liquid.

4. (Cryogenic) Distillation

Cryogenic distillation may also be used to condense VOC to a liquid. In cryogenic distillation a refrigeration system is coupled with a condenser such that compounds with very low boiling points may be liquified and recovered, i.e. volatile organic compounds.

5. Membrane Separation

The membranes may be polymeric (such as silicone, polyvinylidene fluoride or poly (ether block amide) or be prepared from silica or zeolite.

In an embodiment, the nitrogen purification system includes at least one bed of an adsorption medium. In an embodiment, the overhead gas mixture is compressed prior to being passed through the adsorption medium, especially to a gauge pressure of from 300-500 KiloPascals (kPa). In an embodiment, a plurality of adsorption beds is employed—for example, from 4-8 adsorption beds may be used in combination with 8-12 devolatilization bins. This will allow the adsorption beds to be regenerated without disrupting/shutting down the plastomer production. The adsorption beds may be regenerated using either Temperature Swing or Pressure Swing protocols (both of which are known to those skilled in the art).

In an embodiment, the mixed stripper gas is treated upstream of the compressor to remove solids (such as dust and grease) that may damage the compressor.

As noted above, the mixed stripper gas may be compressed to 300-500 kPa. This may lead to the condensation of some VOC which can be collected in a condensate drum.

In an embodiment, the pressurized gas is then sent to an adsorption bed. Alumina is a suitable adsorbent as it contains sites that are active towards the VOC materials contained in a plastomer that is prepared by copolymerizing ethylene with alpha olefins in a solution polymerization process (such as $C_4$ to $C_{10}$ hydrocarbons) and because alumina contains a relatively high number of active sites for a given unit volume.

The particle size of the adsorbent particles is chosen to optimize/balance the number of available active sites for a given volume (which favors small particle size) and pressure drop in the bed (which favors large particle size) using techniques that are known to the skilled person. It will also be recognized that height/diameter ratio of the bed and the flow rate of the gas will affect the pressure drop.

The active sites become "saturated" with VOC after time, which means that the bed is no longer able to effectively remove the VOC from the mixed stripper gas. The adsorbent bed is then "regenerated" (for example, with steam or vacuum) to remove the VOC from the adsorbent.

In another embodiment, a membrane separation technology may be employed as an alternative to (or in addition to) the above described adsorbent bed.

Distillation and absorption techniques are also potentially suitable for the removal of the VOC from the mixed stripper gas but neither of these techniques are preferred.

VOC Measurement

Volatile organic compounds may be measured by techniques well-known to those of ordinary experience. When a precise measurement of VOC is required, then VOC is measured according to ASTM D4526-12 titled "Standard Practice for Determination of Volatiles in Polymers by Static Headspace Gas Chromatography". In practice, a VOC measuring device (e.g. a gas chromatograph) may be coupled to the devolatilization bin to determine the amount of VOC in the mixed stripper gas; further, mathematical models may be employed to calculate the ppm of VOC in the devolatilized pellets from the amount of VOC in the mixed stripper gas.

Effect of VICAT Softening Temperature

It is known to those skilled in the art that linear ethylene homopolymers are quite crystalline and exhibit a high VICAT softening temperature. The crystallinity of copolymers decreases such that copolymers with greater amounts of comonomer become less crystalline and also exhibit a lower VICAT softening temperature.

It is known to strip/devolatilize ethylene homopolymers and ethylene copolymers that still retain some crystallinity (and thus exhibit a relatively high VICAT softening point) with steam. However, at densities below about 0.905 g/cc, ethylene-alpha olefin copolymers become sticky and have a VICAT softening temperature that makes steam stripping difficult/ineffective.

However, we have observed that the reduced crystallinity of these copolymers is also associated with comparatively high diffusion rates of C6 to C8 VOC hydrocarbons from pellets of these copolymers. Thus, it is possible to use a lower temperature to strip these VOC hydrocarbons from the plastomer pellets. This is especially effective for plastomers in a density range of from about 0.880 to 0.905 g/cc.

Antioxidants

In an embodiment, the plastomer pellets contain a conventional antioxidant package that includes a conventional primary antioxidant (e.g. a hindered phenol, such as those sold under the trademark IRGANOX® 1010 or IRGNOX® 1076) and a conventional secondary antioxidant (e.g. a phosphite, such as that sold under the trademark IRGASTAB® 168). In an embodiment, the degradation of the antioxidant that is observed during the devolatilization process of this invention is less severe than the degradation that is observed using a conventional steam stripping process (and this may be quantified by measuring the amount of the phosphite that is oxidized during each process).

EXAMPLES

Example 1: Batch Devolatilization 76.2 kilograms of ethylene-octene copolymer plastomer pellets having a density of 0.866 g/cc and a melt index, MI (or "I2"), of 0.58 g/10 minutes (as determined by ASTM D1235 at a temperature of 190° C., using a 2.16 kg load) were devolatilized in a column (or silo) shaped devolatilization bin using an upflow of nitrogen gas that is provided at 40° C. Table 1 provides a summary of other data from this experiment.

The term "pellet count" describes the number of pellets contained in a 1 gram sample of the plastomer. The bin operated at a pressure of 106 kPa. The pellets had an initial temperature of 31° C. The nitrogen flow rate was 5 kg/hour and the hold up time was 46 hours. As shown in Table 1, the pellets initially contained volatile hydrocarbon (or "VOC") in an amount of 4.98 weight %. After the 46 hours hold up time (or "stripping time"), the pellets had a final VOC level of 80 parts per million by weight (ppm).

TABLE 1

Batch Stripping Experiment

| | | |
|---|---|---|
| Resin Density | g/cc | 0.886 |
| MI (I$_2$) | g/10 min | 0.58 |
| Mass of Resin | kg | 76.7 |
| Pellet Count | #/1 g | 41 |
| Resin Initial VOCs | wt % | 4.98 |
| Pellets Initial Temperature | ° C. | 31 |
| Bin Pressure | kPa | 106 |
| Nitrogen Flowrate | Kg/h | 5 |
| Nitrogen Temperature | ° C. | 40 |
| Holdup Time | h | 46 |
| Resin Final VOCs | ppm | 80 |

Example 2: Batch Stripping

In this example, 71.4 kg of the same type of plastomer pellets were treated in the same type of devolatilization bin used in Example 1 under the conditions shown in Table 2. As summarized in Table 2, a nitrogen flow rate of 10 kg/hour at 47° C. was observed to reduce the final VOC concentration in the pellets to 40 ppm.

TABLE 2

| | | |
|---|---|---|
| Resin Density | g/cc | 0.886 |
| MI | g/10 min | 0.58 |
| Mass of Resin | kg | 71.4 |
| Pellet Count | #/1 g | 41 |
| Resin Initial VOCs | wt % | 4.51 |
| Pellets Initial Temperature | ° C. | 34.2 |
| Bin Pressure | kPa | 106 |
| Nitrogen Flowrate | Kg/h | 10 |
| Nitrogen Temperature | ° C. | 47 |
| Holdup Time | h | 38 |
| Resin Final VOCs | ppm | 40 |

Example 3: Continuous Stripping

In this example, 70.1 kg per hour of an ethylene-octene plastomer (density=0.855 g/cc; melt index, "MI" or "I$_2$"=0.56 g/10 minutes) was provided to a silo shaped devolatilization bin. The continuous process provided a HUT of 17 hours. Flow rates of 25 kg/hr; 45 kg/hr and 65 kg/hr of nitrogen at 57° C. were provided.

As shown in Table 3, the flow rate of 25 kg/hr produced pellets having a final VOC concentration of 3200 ppm, while the 65 kg/hr flow rate reduced the VOC level to 140 ppm.

TABLE 3

Continuous Stripping

| | | |
|---|---|---|
| Resin Density | g/cc | 0.885 |
| MI | g/10 min | 0.56 |
| Mass flowrate of Resin | Kg/h | 70.1 |
| Pellet Count | #/1 g | 40 |
| Resin Initial VOCs | wt % | 4.65 |
| Pellets Initial Temperature | ° C. | 57 |
| Bin Pressure | kPa | 104 |
| Nitrogen Temperature | ° C. | 57 |
| Holdup Time | h | 17 |

TABLE 3-continued

| Continuous Stripping | | | | |
|---|---|---|---|---|
| Nitrogen Flowrate | Kg/h | 25 | 45 | 65 |
| Resin Final VOCs | ppm | 3200 | 2500 | 140 |

Example 4: Sensitivity Analysis on Devolatilization Holdup Time

In this example, a sensitivity analysis is done on batch stripping characteristics of plastomeric pellets with bulk density of 0.880 g/cm³, a melt index, "MI" or "$I_2$" of 0.50 g/10 min and a VICAT softening point of 52.3° C. in a silo-shaped devolatilization bin. This sensitivity analysis was performed using a mathematical model to determine the importance of each process variable on the overall stripping holdup time. The model encompasses a mathematical description of pellets stripping process as a multiphase-multicomponent mass and heat transfer process combined with thermodynamics and hydraulics considerations. This model was validated against extensive experimental data. Table 4 shows the process variables used for this sensitivity analysis as the base case scenario.

TABLE 4

Model Inputs Used for the Base Case in the Sensitivity Analysis

| Bin Capacity | kg | 200 × 10³ |
|---|---|---|
| Bin Top pressure | kPa | 109 |
| Bin Diameter | m | 4.5 |
| Pellets Filling Rate | kg/h | 53.4 × 10³ |
| Pellets Recirculation Rate | kg/h | 1.67 × 10³ |
| Pellets Initial Temperature | ° C. | VICAT-5 |
| Pellets Initial VOCs | wt % | 2.26 |
| Pellets Size | # pellets/g | 40 |
| Bed Void Fraction | — | 0.35 |
| Pellets final VOCs content | ppm | 150 |
| Stripping/Nitrogen Temperature | ° C. | VICAT-5 |
| Nitrogen Flowrate | kg/h | 10 × 10³ |
| Nitrogen Purity | ppm of VOCs | 50 |

The data tabulated in Table 5 briefly demonstrates how each independent process variable affects the overall holdup time as a dependent variable. These results, in particular, identify the effect of level of hydrocarbon in the recycled nitrogen. As shown in Table 5, change in the purity level of the recycled nitrogen provided to the devolatilization bin from 50 ppm in the base case to 100 ppm, increased the overall holdup time by less than 4%. This indicates that the load on hydrocarbon extraction unit can be reduced while stripping is still performed effectively within a reasonable holdup time.

TABLE 5

Sensitivity Analysis Results on a 0.880 g/cm³ and 0.5 MI Plastomer Resin with a VICAT Softening Point of 52.3° C.

| Process Variable | Deviation from the base case | Holdup time (h) |
|---|---|---|
| Base case (process conditions as described in Table 3) | — | 50.5 |
| Pellet size | 30 pellets/g | 53.8 |
| | 50 pellets/g | 48.3 |
| Pellets Initial VOCs | 25% increase in initial VOCs of the base case | 54.0 |
| Nitrogen Flowrate | 12 × 10³ kg/h | 44.8 |
| | 8 × 10³ kg/h | 59.8 |
| | 6 × 10³ kg/h | 76.4 |
| Pellets Recirculation Rate | 3.34 × 10³ kg/h | 56.4 |
| Stripping/Nitrogen Temperature | VICAT-2° C. | 42.8 |
| | VICAT-10° C. | 68.9 |
| Pellets Initial Temperature | VICAT-7° C. | 56.6 |
| Nitrogen Purity | 100 ppm of VOCs | 52.5 |
| Bin Top pressure | 130 | 58.7 |
| | 80 | 39.6 |
| | 60 | 33.0 |

INDUSTRIAL APPLICABILITY

A process for the devolatilization of plastomers. The plastomers have a wide variety of industrial uses and are especially suitable for the preparation of a sealant layer in a multilayer flexible packaging film.

The invention claimed is:

1. A process for the production of devolatilized ethylene-alpha olefin copolymer having a density of about 0.880 to 0.905 g/cc and a melt index, $I_2$, of 0.3 to 30 g/10 minutes as measured by ASTM D1238 at a temperature of 190° C. using a 2.16 kg load, said process comprising:
   i) providing raw pellets of ethylene-alpha olefin copolymer to a devolatilization bin, wherein said raw pellets are characterized by containing volatile hydrocarbon;
   ii) providing nitrogen gas to said devolatilization bin, wherein said nitrogen gas is provided to said devolatilization bin at a temperature of 40° C. to 85° C.;
   iii) discharging devolatilized pellets from said devolatilization bin, wherein said devolatilized pellets contain a lower level of said volatile hydrocarbon than said raw pellets;
   iv) recovering mixed stripper gas comprising a mixture of nitrogen and hydrocarbon from an overhead portion of said devolatilization bin;
   v) directing said mixed stripper gas to a hydrocarbon extraction vessel;
   vi) recovering purified nitrogen from said hydrocarbon extraction vessel; and
   vii) recycling said purified nitrogen to said devolatilization bin.

2. The process of claim 1 wherein said nitrogen gas comprises a combination of purified nitrogen and makeup nitrogen.

3. The process of claim 1 wherein said ethylene ethylene-alpha olefin copolymer comprises ethylene and at least one alpha olefin selected from the group consisting of 1-butene; 1-hexene; and 1-octene.

4. The process of claim 1 wherein said process is completed as a batch process and wherein said raw pellets are not fluidized during said process.

5. The process of claim 1 wherein said hydrocarbon extraction vessel is a temperature swing adsorption vessel.

6. The process of claim 1 wherein said hydrocarbon extraction vessel is a pressure swing adsorption vessel.

7. The process of claim 1 wherein said devolatilized pellets contain less than 150 parts per million by weight of volatile hydrocarbon.

8. The process of claim 1 wherein said nitrogen gas is provided to said devolatilization bin as an upflow.

9. A process for the production of devolatilized ethylene-alpha olefin copolymer having a density of about 0.880 to 0.905 g/cc and a melt index, $I_2$, of 0.3 to 30 g/10 minutes as measured by ASTM D1238 at a temperature of 190° C. using a 2.16 kg load, said process comprising:
   i) providing raw pellets of ethylene-alpha olefin copolymer to a top portion of a devolatilization bin, wherein said raw pellets are characterized by containing volatile hydrocarbon;
   ii) providing a nitrogen gas as an upflow to a bottom portion of said devolatilization bin, wherein said nitrogen gas is provided at a temperature of 40° C. to 70° C.;
   iii) discharging devolatilized pellets from said devolatilization bin, wherein said devolatilized pellets contain a lower level of said volatile hydrocarbon than said raw pellets;
   iv) recovering mixed stripper gas comprising a mixture of nitrogen and hydrocarbon from an overhead portion of said devolatilization bin;
   v) directing said mixed stripper gas to a hydrocarbon extraction vessel;
   vi) recovering purified nitrogen from said hydrocarbon extraction vessel; and
   vii) recycling said purified nitrogen to the bottom portion of said devolatilization bin.

10. The process of claim 9 wherein said nitrogen gas comprises a combination of purified nitrogen and makeup nitrogen.

11. The process of claim 9 wherein said ethylene-alpha olefin copolymer comprises ethylene and at least one alpha olefin selected from the group consisting of 1-butene; 1-hexene; and 1-octene.

12. The process of claim 9 wherein said process is completed as a batch process and wherein said raw pellets are not fluidized during said process.

13. The process of claim 9 wherein said hydrocarbon extraction vessel is a temperature swing adsorption vessel.

14. The process of claim 9 wherein said hydrocarbon extraction vessel is a pressure swing adsorption vessel.

15. The process of claim 9 wherein said devolatilized pellets contain less than 150 parts per million by weight of volatile hydrocarbon.

\* \* \* \* \*